United States Patent Office 2,747,994
Patented May 29, 1956

2,747,994

REINFORCED CEMENTITIOUS INSULATING MATERIAL AND METHOD OF PREPARATION THEREOF

Harry P. Hoopes, Berkeley, Calif., assignor to Pabco Products Inc., San Francisco, Calif., a corporation of Delaware No Drawing. Application October 17, 1952,
Serial No. 315,427

7 Claims. (Cl. 92—3)

This invention relates to relatively light weight porous cementitious heat insulating material which is usually reenforced with asbestos fiber.

A well known insulating material of this type is so-called magnesia insulation in which asbestos fiber is generally employed as the reenforcing agent because such material does not have sufficient inherent strength, as do the much heavier cementitious materials formed, for example, from Portland cement. Other similar materials, adapted for high temperature insulation but somewhat heavier than magnesia insulation although still relatively light in weight compared to cementitious material formed from Portland cement, and also containing asbestos fiber reenforcement, may be formed from silicious material, and a bonding medium such as a relatively small percentage of lime or basic magnesium carbonate, and may contain argillaceous material such as bentonite clay.

An important purpose of the reenforcing agent for which the asbestos fiber is suitable, is that of imparting so-called "hinging" strength to the final shaped mass of the product, namely, the ability to hold the product together when subjected to bending stresses, as such products are comparatively fragile. Usually the amount of asbestos reenforcing fiber is between 5% and 17.5% of the total weight of the product, depending upon the specific character of the product, and preferably in the order of approximately 10% by weight.

For extensive commercial use, it is difficult to obtain asbestos fiber having relatively long filaments; the present commercially available asbestos having filaments approximately 1/8 to 1½ inches in length. Such length filaments do not provide all to be desired insofar as hinging strength is concerned. So-called "fiber-glass" (glass fiber) is very suitable as a reenforcement but the individual filaments thereof are of such character as to create physical problems when they are mixed in the aqueous slurry of the cementitious material from which the shaped heat insulating product is produced. This is so because such fiber has the property of readily interlacing crosswise, creating a matting effect, making it difficult to distribute the same uniformly throughout the slurry when employed in relatively large amounts or in amounts equivalent to the amounts of asbestos fiber employed in any given slurry.

Also, if the quantity of glass fiber is too great, a problem obtains when the slurry is poured into relatively narrow molds adapted to mold slabs or tubes of the material in comparatively narrow thicknesses, for example, in the order of 1 inch to 2 inches. Hence, commercial difficulties exist in substituting glass fiber for all the relatively short length asbestos fiber available commercially or in employing relatively large amounts of such fiber, even though the described interlacing of glass fiber filaments is advantageous in enhancing reenforcement of the final shaped product. Furthermore, relatively large amounts of asbestos fiber have been found necessary in order to provide for maximum strength in the binding effect of the bonding medium which holds the final product together.

Summarizing this invention, it embodies substituting glass fiber for only some of the asbestos fiber in an amount which is a relatively small percent of the total amount of fiber. Such substitution of a minor amount of the glass fiber provides marked increase in reenforcing strength, particularly hinging strength; and in the case of so-called self-set magnesia insulation marked increase in the modulus of rupture is also obtained. At the same time, the relatively small amount of glass fiber used does not create the previously mentioned physical problems.

In greater detail, the amount of glass fiber substituted for the asbestos fiber should not be large enough to create the objectionable matting effect, and for this reason should not exceed approximately 25% by weight of the total weight of the fiber usually employed as the reenforcement for heat insulating material of the type related; the total amount of fiber being generally from 5% to 17.5% by weight of the final product, as previously related. Also, the glass fiber filaments should not be of too great a length because if too long, difficulty exists in obtaining uniform dispersion thereof in the aqueous slurry of the material. For this reason, the glass fiber filaments should not exceed much over 3½ inches in length. Preferably, the length of the glass fiber filaments employed herein is approximately 2 inches, as hinging strength is not markedly increased with longer glass fiber filaments; while such fiber should not be much less than 1 inch in length but the major portion thereof longer than substantially all of the asbestos fiber.

Thus, the reenforcing fiber mixture of this invention consists essentially of a major proportion of asbestos fiber and a minor proportion of glass fiber wherein the glass fiber is present in any amount up to approximately 25% by weight of the total weight of fiber and the amount of asbestos fiber is at least 75% by weight of the total weight of fiber. Substantially all of the glass fiber filaments are relatively long compared to the length of the asbestos fiber filaments; the length of asbestos fiber filaments being, as previously stated, about 1/8 inch to 1½ inches.

Any of the usual asbestos fibers heretofore employed as reenforcement in heat insulating material of the character related, can be used. Suitable commercial fiber presently available are amosite fiber obtained from the Transvaal or chrysotile fiber obtained from Canada, or suitable mixture thereof. The diameter of the filaments of these fibers may vary from 0.00004 inch to 0.00010 inch.

The glass fiber may be of the usual filament diameters commercially available in the form of so-called fiber yarns. These yarns are generally supplied in the form of so-called roving formed of a plurality of indivdual filaments. A common commercial form of such glass fiber yarn comprises approximately 100 strands to the roving with each strand being composed of approximately 200 filaments of approximately 0.00038 inch in diameter. These filaments are generally coated with a suitable resinous type coating, such as a polyvinyl acetate coating. The particular diameter of filaments is not critical herein as the filament diameter may vary widely; and uncoated filaments may be employed.

However, because of commercial availability, the described type of coated glass fiber of approximately 0.00038 inch filament diameter is preferred. When utilized, the glass fiber is first cut up by cutting the roving or the individual strands by any suitable means, into lengths of approximately 2 inches for the reason explained previously. In this connection, to gain increased hinging strength, it is only necessary that the length of the glass fiber filaments be substantially all longer than that of the asbestos fiber, so that substantially all the glass fiber is relatively long compared to the length of the asbestos fiber.

In incorporating the fiber reenforcement into the aqueous slurry, namely, the mixture consisting essentially of the major proportion of asbestos fiber and the minor proportion of glass fiber, this can be done by adding the fiber to the aqueous slurry separately or together at any point in the production of the aqueous slurry prior to pouring the same into molds, and by thoroughly intermixing all the fiber uniformly throughout the slurry by any suitable mixing means, before the slurry is poured into the molds for shaping the product. When the fiber is thoroughly intermixed throughout the slurry, the asbestos fiber will be uniformly dispersed in the slurry with its individual filaments in divided form. Also, when subjected to the water of the slurry, the major proportion of the glass fiber, namely, over 50% by weight thereof, will become substantially all divided into individual filaments of the desired length which will have crosswise interlacing uniformly throughout the slurry to thus provide for marked increase of hinging strength of the final shaped product, compared to such product were it to contain the same total amount of fiber but entirely asbestos fiber. In this connection, those glass fiber strands that do not become substantially all divided into individual filaments, enhance the hinging strength.

Employment of the relatively small proportion of glass fiber in the total amount of asbestos fiber and glass fiber, also has the marked effect of increasing the modulus of rupture of magnesia insulation made from so-called self-set normal magnesium carbonate trihydrate crystals according to the procedure disclosed in assignee's Patent No. 2,209,754, dated July 30, 1940. This is believed to be due to the fact that the glass fiber distributes itself so uniformly throughout the slurry in crosswise interlaced relationship, as to cause during the setting of the normal magnesium carbonate trihydrate crystals, an enhanced bond with the fiber. The following is an example for the production of such self-set magnesium carbonate insulation incorporating the mixture of asbestos and glass fiber reenforcement of this invention. With respect to this particular type of self-set magnesia insulation product, the amount of glass fiber may vary from 0.5% to 10% of the total weight of fiber in the final product; and the total weight of fiber may vary from 5% to 17.5% of the total weight of the final product.

*Example I*

Mix an amount of magnesium hydroxide (Mg(OH)$_2$) calculated on the basis of 650 lbs. of magnesium oxide (MgO) in 2500 gallons of water at room temperature to provide a magnesium hydroxide suspension in the water. Gas this suspension while simultaneously agitating the suspension, with flue gas containing 10% by volume of carbon dioxide until substantially all the magnesium is in the form of fine needle-like self-setting crystals of normal magnesium carbonate trihydrate. As is explained in the aforementioned patent, when these crystals are all in the proper form can be determined by microscopic observation, but it will usually take approximately 5 hours for this to occur with flue gas containing 10% by volume of carbon dioxide, supplied under average conditions from the source thereof.

After the gassing and substantially complete formation of all the magnesium in the form of the described self-setting crystals, add to the aqueous slurry 190 pounds of a mixture consisting essentially of 97.5% by weight of chrysotile fiber, averaging ⅛ inch to ½ inch in filament length and 2.5% by weight of the previously related preferred diameter glass fiber chopped up into strands of 2 inches in length. All the fiber should be thoroughly mixed into the slurry by any suitable mixing means, so as to be uniformly dispersed therein. The resultant slurry is then filtered in any conventional mechanical filter, preferably a so-called Oliver filter; and the cake is washed clean with fresh water. The resultant cake is then rediluted with an amount of water in accordance with the desired density of the final product desired.

For a density of about 11 pounds per cu. ft., such filter cake should be diluted with 310 gallons of water, and the slurry thoroughly mixed. If a greater density of the final product is desired, add less water, and vice versa for a lighter density final product. The diluted slurry is then preheated with live steam, as described in the aforementioned patent, from room temperature up to 145° F. which will take about four minutes, and is then promptly poured into heated molds which may be of the type disclosed in applicant's co-pending application, Serial No. 191,696, filed October 23, 1950, issued as Patent No. 2,631,351, dated March 17, 1953. At the time the slurry is poured into the mold, the mold is heated to a temperature of 190° F. and the slurry is held in the mold for about 9 minutes while the temperature of the mold is maintained at 190° F., and is then ejected from the mold in self-supporting form. Finally, the ejected mass is dried to constant weight. At 400° F. this will take approximately 24 hours for tubes or slabs about 1½ inches thick.

The final product has a weight of approximately 11 pounds per cu. ft.; and the amount of reenforcing fiber therein is approximately 11% by weight of the total weight of the product; the glass fiber being approximately 2.5% by weight of the total weight of fiber which is thoroughly distributed throughout the mass with the glass fiber substantially uniformly interlaced in crosswise relationship and uniformly dispersed throughout the asbestos fiber. This final product compared to a product made in the same proportions of ingredients of the same type, except containing 100% asbestos fiber, has an increased modulus of rupture in the order of 10%, and a marked increase in hinging strength.

*Example II*

Another type of heat insulation adapted to withstand higher temperatures than the above described magnesia insulation can be formed by a well known method from an aqueous slurry containing a major porportion of silicious materials, and a minor portion of lime as the bonding agent. A suitable typical product is formed from the following ingredients in percent by weight:

| | Per cent |
|---|---|
| Calcined diatomaceous earth | 82.5 |
| Lime | 8.5 |
| Reenforcing fiber composed of 95% by weight amosite (averaging ½ inch to 1½ inches in filament length), and 5% by weight of the preferred glass fiber of a strand length of substantially 2 inches | 9.0 |
| | 100.0 |

This batch is then formed into a slurry with 12 parts by weight of water to 1 part by weight of the total amount of the above described substances and thoroughly mixed by any suitable means until the fiber and other substances are thoroughly and uniformly dispersed in the slurry. The resultant slurry is then poured into conventional filter press molds maintained under 50 lbs. pressure in the usual manner until substantially all excess water is removed, whereupon the shaped self-supporting mass is dried in an oven to constant weight. For a 5 inch thick slab, this will take approximately 36 hours at 350° F. The resultant final product will weigh approximately 25 lbs. per cu. ft., and contains a total amount of fiber which is 9% of the total weight of the product, and in which the glass fiber constitutes 5% by weight and the asbestos fiber 95% by weight.

In this type of product, and also that of the following Example III, the total weight of fiber, may vary from 5% to 17.5% by weight of the total weight of the product; and the amount of glass fiber may vary from 3% to 25% by weight of the total weight of fiber.

Example III

A further typical formulation comprising a major proportion of silicious material and a minor proportion of a bonding medium but somewhat different from that of Example II, and which is also adapted for so-called high temperature insulation and in which the asbestos fiber and the glass fiber are of the type and size described in Examples I and II, is as follows:

|  | Per cent |
|---|---|
| Calcined diatomaceous earth | 65.0 |
| Bentonite clay | 14.0 |
| White china clay | 4.0 |
| Reenforcing fiber composed of a mixture of asbestos fiber (a 50% by weight mixture of each of amosite fiber and chrysotile fiber) and glass fiber (2 inch strands) in which the glass fiber constitutes 5% by weight of the total amount of fiber | 10.0 |
| Basic magnesium carbonate | 7.0 |
|  | 100.0 |

These substances are formed into a slurry with 10 parts by weight of water to 1 part by weight of total solids; and the materials are thoroughly mixed as in Example II. The mixed slurry is then poured into conventional filter press molds maintained at 50 lb. pressure and treated in the same manner as the product of Example II until all excess water is removed. The shaped mass is then dried in an oven to constant weight, as in Example II. For 5 inch thick slabs, this drying will take approximately the same time as the product of Example II, namely, 36 hours at 350° F. The resultant product weighs approximately 26 pounds per cu. ft., and contains 10% by weight of reenforcing fiber in which the amount of glass fiber is 5% by weight of the total amount of fiber:

I claim:

1. A relatively light weight mass of porous cementitious heat insulating material containing reenforcing fiber consisting essentially of a major proportion of asbestos fiber and a minor proportion of yarn-type glass fiber filaments, the asbestos fiber being at least 75% by weight of the total weight of the fiber and the glass fiber being present in an amount up to approximately 25% by weight of the total weight of the fiber, and substantially all of the glass fiber being longer than the asbestos fiber.

2. A relatively light weight mass of porous cementitious heat insulating material containing reenforcing fiber in an amount between approximately 5% and 17.5% by weight of the total weight of the mass; said fiber consisting essentially of at least 75% by weight of asbestos fiber, and yarn-type individual glass fiber filaments in an amount up to 25% by weight of the total weight of the fiber, the filament lengths of substantially all of the glass fiber not exceeding substantially 3½ inches.

3. A relatively light weight mass of porous cementitious magnesia heat insulating material containing reenforcing fiber in an amount between approximately 5% and 17.5% by weight of the total weight of the mass, said fiber consisting essentially of asbestos fiber and yarn-type individual glass fiber filaments, the amount of glass fiber being between approximately 0.5% and 10% by weight of the total weight of fiber, and substantially all of said glass fiber being longer than the asbestos fiber, the filament lengths of substantially all of the glass fiber not exceeding substantially 3½ inches.

4. A relatively light weight mass of porous cementitious heat insulating material comprising silicious material and a bonding agent and containing reenforcing fiber in an amount between approximately 5% and 17.5% by weight of the total weight of the mass, said fiber consisting essentially of asbestos fiber and yarn-type individual glass fiber filaments, the amount of glass fiber being between approximately 3% and 25% by weight of the total weight of fiber, and the filament lengths of substantially all of the glass fiber not exceeding 3½ inches.

5. The method of reenforcing a relatively light weight mass of porous cementitious heat insulating material which comprises forming an aqueous slurry of said material, incorporating in said slurry reenforcing fiber consisting essentially of a major proportion of asbestos fiber and a minor proportion of yarn-type glass fiber, the total amount of the glass and the asbestos fibers being such as to constitute approximately 5% to 17.5% by weight of the total weight of said mass, minimizing substantial matting which would otherwise be imparted to the slurry by the glass fiber and at the same time enhancing hinging strength of said mass by employing an amount of the glass fiber between approximately 0.5% to 25% by weight of the total weight of the glass and the asbestos fibers, effecting substantially uniform dispersion of said glass and said asbestos fibers in said slurry by employing the glass fiber having substantially all of its fibers longer than the asbestos fiber, pouring said fiber containing slurry into a mold, and shaping the fiber containing slurry in said mold.

6. The method of providing a reenforced, relatively light weight mass of porous cementitious heat insulating material which comprises forming an aqueous slurry of said material; incorporating reenforcing fiber in said slurry in an amount of from 5% to 17.5% by weight of the total mass, said reenforcing fiber consisting essentially of at least 75% by weight asbestos fiber substantially all longer than ⅛ inch, and less than 25% by weight of yarn-type glass fiber roving composed of a plurality of individual filaments that are substantially all longer than said asbestos fiber but are less than substantially 3½ inches in length; mixing said slurry and said reenforcing fiber until said asbestos fiber and said glass fiber are substantially uniformly dispersed in the slurry and the major proportion of said glass fiber roving is divided into individual filaments; pouring said fiber containing slurry into a mold, and shaping the fiber-containing slurry in said mold.

7. A relatively light weight mass of porous cementitious heat insulating material containing reenforcing fiber in an amount of from 5% to 17.5% by weight of the total mass, said reenforcing fiber consisting essentially of at least 75% by weight asbestos fiber substantially all longer than ⅛ inch, and less than 25% by weight of yarn-type glass fiber roving composed of a plurality of individual filaments that are substantially all longer than said asbestos fiber but are less than substantially 3½ inches in length, said glass fiber roving being substantially uniformly distributed in the material and the major proportion of said glass fiber roving being present as individual filaments.

References Cited in the file of this patent
UNITED STATES PATENTS

| | | |
|---|---|---|
| 1,887,726 | Weber | Nov. 15, 1932 |
| 2,033,928 | Driscoll | Mar. 17, 1936 |
| 2,132,702 | Simpson | Oct. 11, 1938 |
| 2,162,386 | Neuhof | June 13, 1939 |
| 2,247,355 | Brown | July 1, 1941 |
| 2,335,242 | Greider et al. | Nov. 30, 1943 |
| 2,407,581 | Smith et al. | Sept. 10, 1946 |
| 2,485,458 | Quinn et al. | Oct. 18, 1949 |
| 2,493,604 | Walters | Jan. 3, 1950 |
| 2,581,069 | Bertolet | Jan. 1, 1952 |
| 2,609,733 | Honnig | Sept. 9, 1952 |
| 2,626,213 | Novak | Jan. 20, 1953 |